May 10, 1927. 1,628,219
C. H. BENEDICT
CLUTCH MECHANISM
Filed July 10. 1926 5 Sheets-Sheet 1

Inventor
Charles H. Benedict.
by Parker & Carter
Attorneys.

May 10, 1927.

C. H. BENEDICT

CLUTCH MECHANISM

Filed July 10, 1926

Inventor
Charles H. Benedict
by
Attorneys.

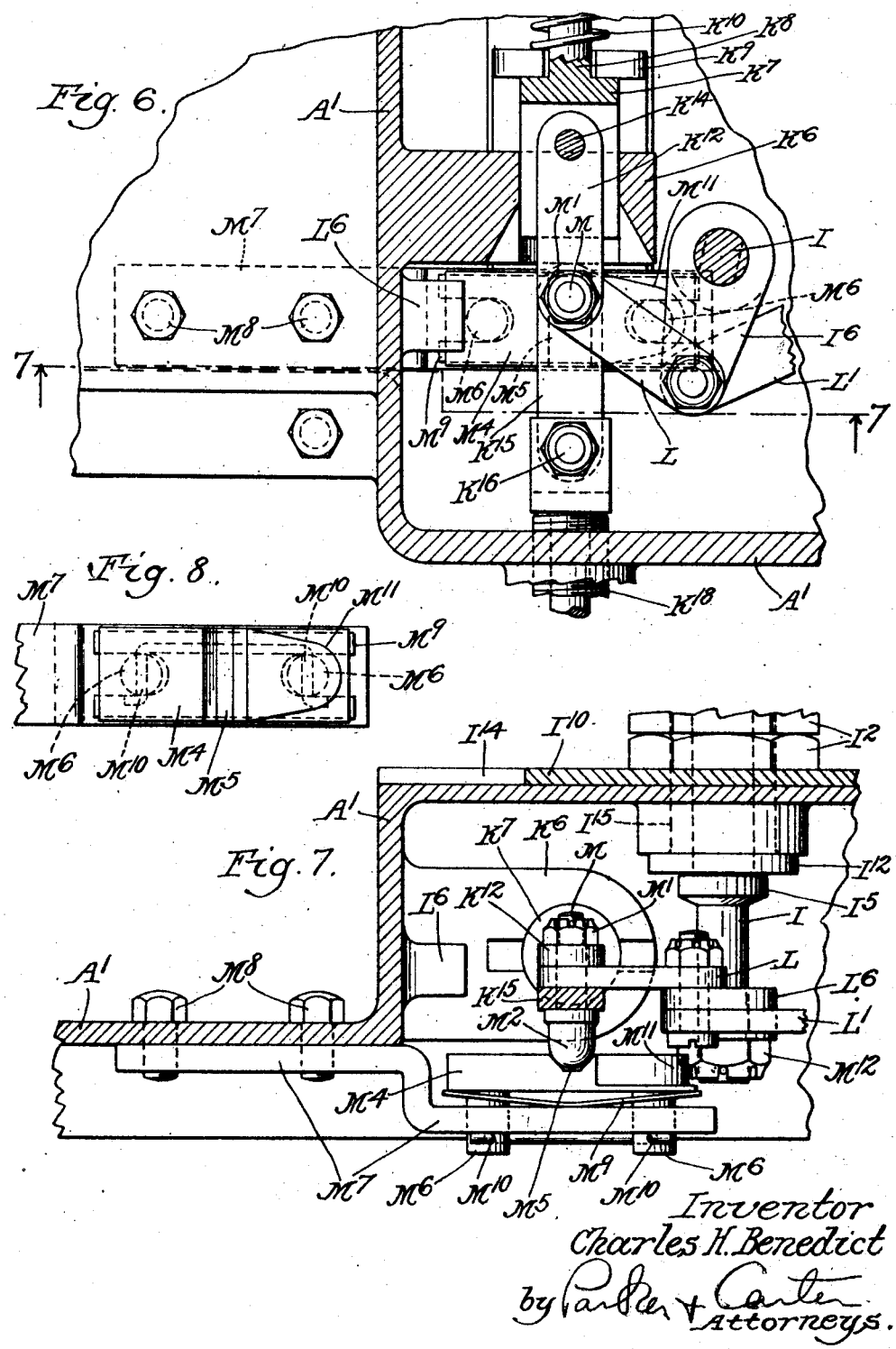

Patented May 10, 1927.

1,628,219

UNITED STATES PATENT OFFICE.

CHARLES H. BENEDICT, OF STREATOR, ILLINOIS, ASSIGNOR TO ANTHONY COMPANY, OF STREATOR, ILLINOIS, A CORPORATION OF ILLINOIS.

CLUTCH MECHANISM.

Application filed July 10, 1926. Serial No. 121,520.

My invention relates to a clutch and particularly to a clutch adapted to be interposed between a driving and a driven shaft, in association with a brake mechanism for the driven shaft. One object of my invention is to provide a combined clutch and brake assembly with a single control means therefor. Another object is the provision of such an assembly and a control means wherein, by the movement of a control member, the brake and the clutch may be operated in succession. Other objects will appear from time to time in the course of the specification and claims.

I illustrate my invention more or less diagrammatically in the accompanying drawings, wherein—

Figure 6 is a sectional view similar to Figure 2, showing a yielding brake retainer;

Figure 7 is a section along the line 7—7 of Figure 6; and

Figure 8 is a detail plan view of the yielding brake retainer block.

Figure 1:
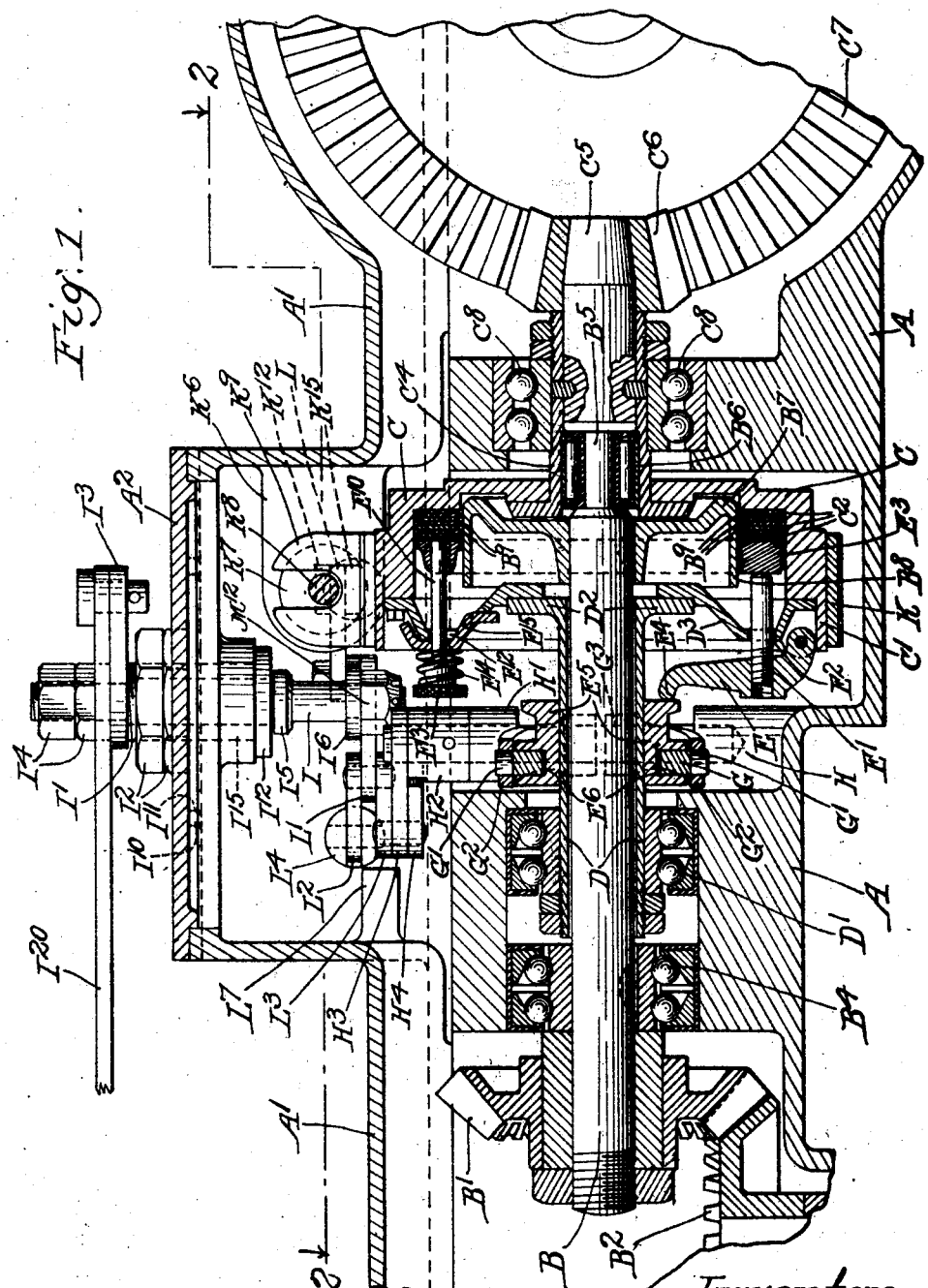
Figure 1 is a vertical section along the axis of the driving and driven members.

Like parts are indicated by like symbols throughout the specification and claims.

A generally indicates any suitable frame in which the clutch is mounted, $A^1$ being a cover plate therefor and $A^2$ a removable plate in such cover plate.

B indicates a driven shaft, illustrated as carrying at its outer end the bevel pinion $B^1$, in mesh with the bevel gear $B^2$ driven from any suitable power source not herein shown. The shaft B is mounted, for example, in the ball bearing generally indicated as $B^4$, and is provided at its inner end with a reduced portion $B^5$ mounted in the roller bearings $B^6$. Keyed to the inner end of the shaft B is the clutch member $B^7$ carrying the cylindrical flange $B^8$, outwardly projecting from which are the clutch rings $B^9$, slidable along but feathered to the flange $B^8$.

Surrounding the clutch $B^7$ is the brake drum, generally indicated as C having the cylindrical flange $C^1$ with the clutch rings $C^2$ feathered thereto, and interposed between the clutch rings $B^9$. The drum C has secured to it the generally cylindrical sleeve $C^4$, in the outer end of which is secured the shaft $C^5$ which carries the bevel pinion $C^6$ in mesh with the bevel gear $C^7$. $C^8$ generally indicates any suitable ball or roller bearings for the sleeve $C^4$.

Surrounding and spaced from the shaft B is the generally cylindrical sleeve D, rotatably mounted in the ball bearings generally indicated as $D^1$. The sleeve D is provided with an outwardly projecting flange $D^2$, connected by any suitable disc or spider member $D^3$ with the cylindrical flange $C^1$ of the clutch drum C.

Pivoted upon the member $D^3$ are the levers E. Screw threaded into the levers, intermediate their ends, are the pins $E^1$, which pass through apertures $E^2$ in the member $D^3$, and are fixed at their inner ends in the collar $E^3$ lying adjacent the clutch rings $B^9$ and $C^2$. The opposite end of each of said levers E, engages, as at $E^4$, a collar $E^5$, slidable along the exterior of the sleeve D.

In order to insure the release of the collar $E^3$ I may provide a plurality of pins $E^{10}$, each passing through the member $D^3$ as at $E^{12}$ and provided with a head $E^{13}$, between which and the outer face of $D^3$ is compressed the helical spring $E^{14}$. $E^{15}$ is any suitable inner abutment for such spring adapted to engage the member $D^3$ and to bridge the apertures therein.

The slide collar $E^5$ is circumferentially grooved as at $E^6$ to receive the open ring or U-shaped member G, provided with the diametrically opposed pins or trunnions $G^1$ which are received in the ends of the curved levers $G^2$, which levers are pinned on the shaft $G^3$. The shaft $G^3$ is mounted in the bearings H, $H^1$. Pinned to the shaft, beyond the bearing $H^1$, is the collar $H^2$, and positioned above or beyond said collar is the crank $H^3$, rotatable about the shaft. Secured to the crank $H^3$ is the pawl member $H^4$ the inner end of which is opposed to the sleeve $H^2$, the opposing portions being so shaped as to permit a slight movement of the crank $H^3$ in relation to the shaft $G^3$ before the pawl member $H^4$ engages the sleeve $H^2$ and prevents further relative movement of crank and shaft.

Surrounding the drum C is the brake band K, upstanding from one end of which is the abutment member $K^1$ adapted to engage an adjustable stop member $K^2$ shown as screw threaded in the boss $K^3$ which projects inwardly from the housing cap or cover $A^1$. The stop member $K^2$ is outwardly headed as at $K^4$ and is provided with a lock nut $K^5$. Mounted for movement in a lug $K^6$ projecting from the side of the housing cover $A^1$ is the piston $K^7$, the reduced end $K^8$ of which penetrates the upstanding brake band abutment $K^9$, the abutment $K^1$ at the opposite end of the brake band, and the stop member $K^2$ which is axially apertured to receive it and forms a guide therefor. $K^{10}$ is a helical spring adapted to be compressed between the abutments $K^1$ and $K^9$. The piston $K^7$ is slotted to receive the link $K^{12}$ pivoted to it as at $K^{14}$ and pivoted at M at its opposite end to a link $K^{15}$ the opposite end of which is pivoted as at $K^{16}$ to the adjustable stem $K^{17}$. $K^{18}$ is a screw threaded adjustment sleeve provided with the head $K^{19}$ and the lock nut $K^{20}$. $K^{21}$ is a lock nut, screw threaded at the outer end of the pin $K^{17}$.

The mechanism for actuating the clutch and brake band are described as follows:

I is any suitable control shaft mounted for example in the bearing sleeve $I^1$ which passes upwardly through the cover $A^1$. $I^2$ are any suitable lock nuts for locking the sleeve $I^1$ in position. $I^3$ is any suitable crank or handle secured against rotation to the outer end of the shaft I, and held in position, for example by the lock nuts $I^4$. It may be operated in any suitable manner, for example by means of the link $I^{20}$ extending to any suitable control member or lever.

$I^5$ is a flange on the shaft I to limit the outward movement of the shaft I in relation to the sleeve $I^1$. Secured against rotation in relation to the shaft I, and positioned at the inner end thereof is the crank arm $I^6$. I provide for lateral adjustment of the shaft I as follows: $I^{10}$ is a plate, slotted as at $I^{11}$, against which abut the lock nuts $I^2$. The sleeve $I^1$ is provided at its inner end with the outwardly projecting collar or flange $I^{12}$. It will be understood that the plate $I^{10}$ is slidable along the housing, being guided for example within the groove $I^{14}$. The housing itself is slotted as at $I^{15}$ transversely of the inclined slot $I^{11}$. The movement of such plate along such groove and the engagement between the inclined slot $I^{11}$, and the sleeve $I^1$ serves to move such sleeve along the slot $I^{15}$, the lock nuts $I^2$ being loosened to permit such movement and being tightened when it is completed.

The crank arm $I^6$ has pivoted to it the link L the opposite end of which is pivoted to the junction of the brake band controlling toggle links $K^{12} K^{15}$. The arm $I^6$ also has pivoted to it about the same axis a second link $L^1$ the opposite end of which is pivoted to a second toggle consisting of the links $L^2$ and $L^3$. The opposite end of the link $L^2$ is pivoted to a pin $L^4$ similar to the pin $K^{17}$ and similarly adjustable. The link $L^3$ is pivoted at its outer end to the outer end of the clutch operating lever $H^3$.

The movement of the toggle links $K^{12} K^{15}$ is limited by the stop $L^6$, so positioned that when the links $K^{12}$ and $K^{15}$ are positioned thereagainst the parts are in neutral with both the brake band and the clutch disengaged. The movement of the toggle links $L^2 L^3$ in the opposite direction is limited by the stop $L^7$. When they are so positioned the brake band is released and the clutch is set. When the links $K^{12} K^{15}$ are in the position shown in full lines in Figure 2 the brake is set and the clutch is released.

As shown in Figures 6, 7 and 8 the pivot bolt M which connects the links $K^{12} K^{15}$ is secured above by the nut $M^1$ and has the head $M^2$ below with its lower end rounded to ride upon the retainer block $M^4$ which has the groove $M^5$ to receive the rounded head $M^2$ when the levers $K^{12} K^{15}$ are in line and the brake is set. The retainer block has the downwardly projecting pins $M^6$ guided in the bracket $M^7$ bolted at $M^8 M^8$ to the cover plate $A^1$. Interposed between the block $M^4$ and the bracket $M^7$ is a flat spring $M^9$ which forces the block $M^4$ upwardly against the stop pins $M^{10}$. The block $M^4$ is cut away on its upper side as at $M^{11}$ to allow clearance for the nut $M^{12}$ on the lower end of the shaft I.

The use and operation of my invention are as follows:

I employ a driving shaft and a driven shaft with a clutch mechanism between them, whereby the driven shaft may be driven at will from the driving shaft, and a brake, herein shown as including a drum applied to the driven shaft and a band thereabout. One application of my clutch and brake mechanism is to hoisting devices wherein intermittent hoisting and loading movements are desired, for example the winding in or paying out of a cable, and wherein it is desirable to provide a brake for the driven member, whereby it may be held positively against movement when not being actually driven. I house the mechanism completely, there projecting from the housing the end of the shaft I with its outer control lever $I^3$. Within the housing is enclosed not only the actual clutch and brake mechanisms, but the actuating mechanisms therefor. I have indicated, as my preferred actuating mechanisms, toggle connections or pairs of toggle links, one of each of such pair of links being pivoted at its outer end to the housing, or to the adjustable members K¹⁷, L⁴, positioned within the housing, and adjustable for example by means of the lock nuts K²⁰. This adjustment may be externally affected so that in the normal operation of the device the housing need never be opened.

To effect the actual braking and clutch operation I provide any suitable clutch mechanism, for example the mechanism earlier described in detail above. The clutch, however, is controlled by the lever G² on the shaft G³ and the shaft G³ is rotated in response to the crank arm H³, there being the toggle links L² L³ between the crank arm H³ and the adjustable member L⁴. The springs E¹⁴ serve to keep the clutch discs normally disengaged, the springs E¹⁴ pressing against the heads E¹³ of the pins E¹⁰ and thus withdrawing the collar E³ from the clutch rings B⁹ and C².

The brake mechanism is characterized by a brake drum upon the driven shaft and a brake band K thereabout, the brake band being normally held inoperative or disengaged, for example by the helical spring K¹⁶. It will thus be clear that I provide a mechanism wherein both clutch and brake are normally disengaged and are yieldingly so held, but wherein a positive actuating connection is interposed, herein shown as a toggle connection between the surrounding housing A¹ and the clutch controlling crank arm H³ and the brake controlling piston K⁷ respectively, whereby, in response to actuation of the respective toggle connections, either the clutch or the brake may be engaged, in opposition to the yielding means normally tending to hold them disengaged. To actuate the toggles I provide the control shaft I with the crank arm I⁶ thereupon, and links L L¹ between it and the respective toggle connections.

Figure 4:
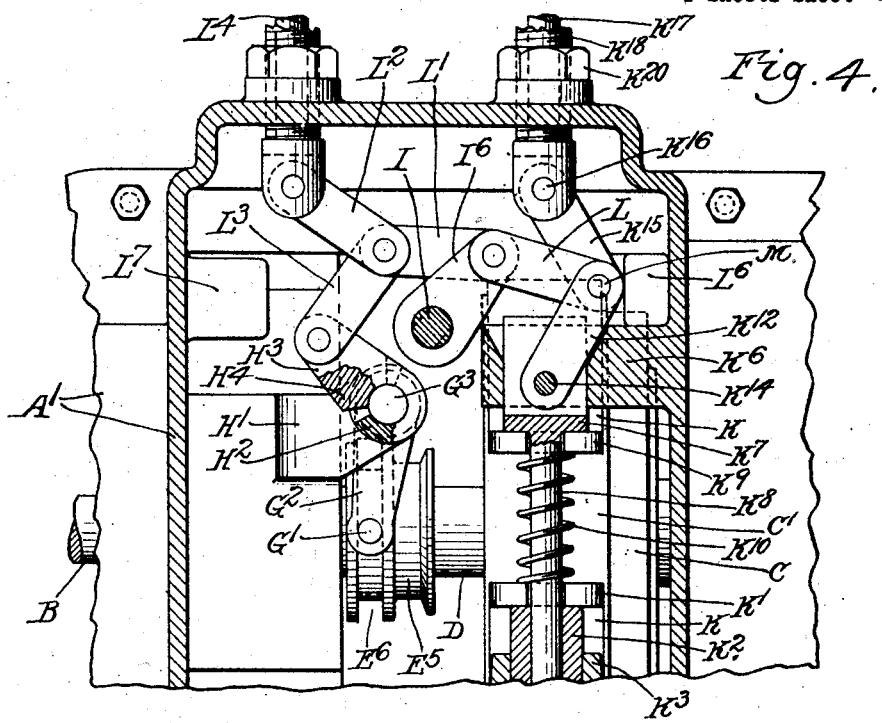
Figure 4 is a section similar to that of Figure 2, illustrating the parts in neutral position.
Figure 5:
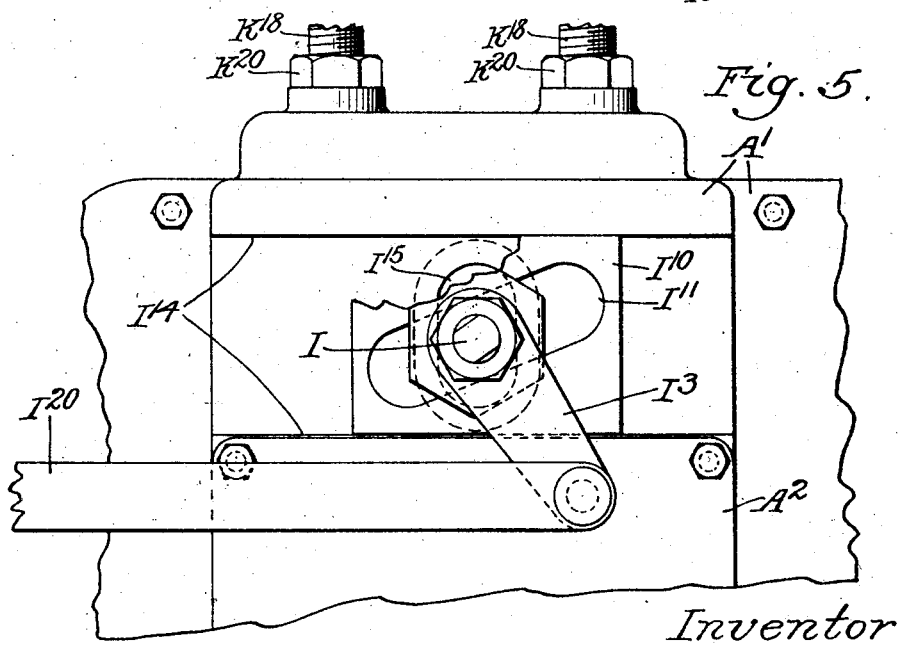
Figure 5 is a partial plan view with the parts entirely in the same position as in Figure 4.

The parts are so proportioned that when the crank arm I⁶ is positioned to the extreme right, as shown in Figure 4, both toggle connections are broken and both clutch and brake are therefore yieldingly held in inoperative position. As the arm I⁶ is rotated to the left it first straightens the brake controlling toggle, and actuates the brake. At the same time the link I⁶ operating upon the toggle links L² and L³ moves the crank arm H³ and its pawl H⁴ counterclockwise whereby the pawl H⁴ engages the stop H² on the shaft G³. As the rotation of the arm I⁶ continues further the toggle connection for the brake is broken and the brake is released, and the clutch connection, effected through rotation of the shaft G³ and movement of the arm G¹ is made.

Figure 2:
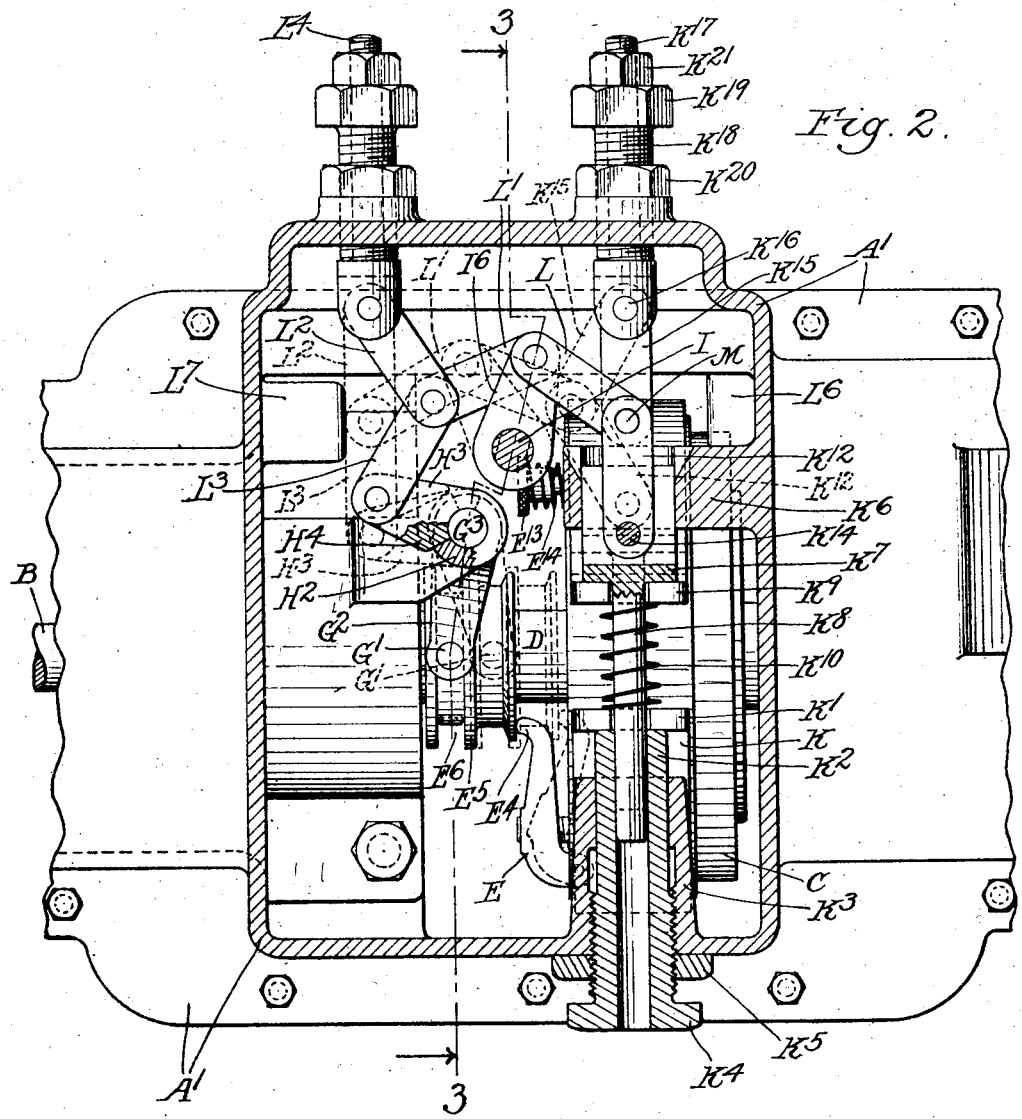
Figure 2 is a section along the line 2—2 of Figure 1 illustrating in full line the brake set and the clutch released and in dotted line the brake released and the clutch set.

In the form herein shown in Figures 2 and 4 when the link K¹² abuts against the stop K⁶ both clutch and brake are necessarily inoperative or neutral. When, at the opposite end of the excursion of the arm I⁶, the link L³ reaches the abutment L⁷ the brake is necessarily inoperative and the clutch operative. Obviously I might otherwise proportion the stop L⁷ and provide for an additional neutral period at the termination of the excursion of the lever I⁶.

Figure 3:
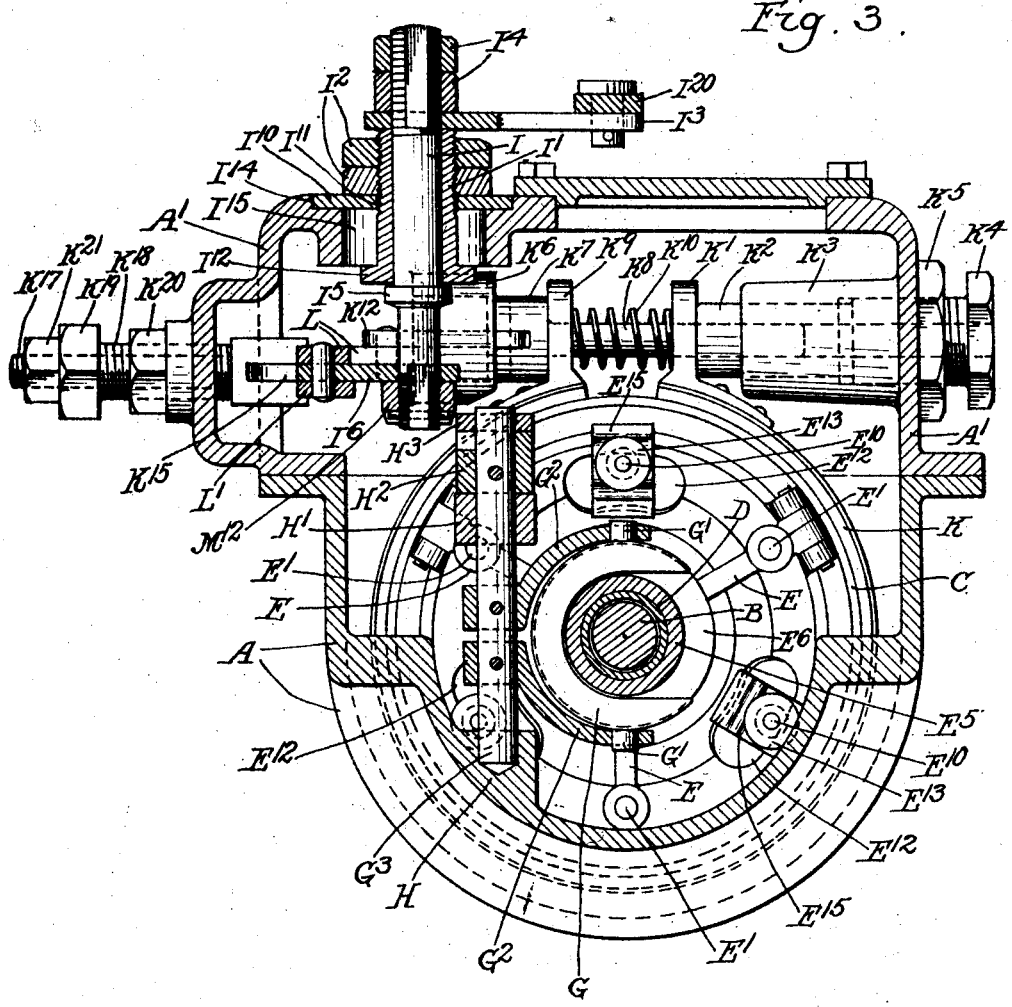
Figure 3 is a section along the line 3—3 of Figure 2.

The adjustment of the brake, either to take up wear, or to control the tightness or looseness of operation, may be effected from either side of the housing and it may be necessary to effect the adjustment from both sides, owing to the close spacing of the brake members K and K⁹ in relation to the lugs K³ and K⁶. Therefore I provide, in addition to the stem K¹⁷ the hollow bushing K², shown as screw threaded into the boss K³ which projects inwardly from the housing cap or cover A¹. The bushing K² may be adjusted by means of the external lock nut K⁵, screw threaded upon the outer end thereof. The adjustment is effected by the longitudinal movement of the bushing K², against which abuts the brake band abutment K¹⁰, shown for example in Figure 3.

The adjustable members L⁴ and K² and K¹⁷ permit of adjustment or take-up to provide for wear of the various parts in connection with the means for actuating brake and clutch. I provide further an adjustment of the shaft I in relation to the brake and clutch controlling the toggles, in order to adjust or control the relation between brake and clutch actuation.

Under some circumstances a brief time interval may be advantageous between the release of the brake and the actuation of the clutch, and for other purposes it may be desirable to have the clutch actuated the instant the brake is released. This change in timing I effect by the said adjustment in the position of the shaft I.

I claim:

1. A drive mechanism, a drive shaft, a driven shaft, a clutch connection therebetween, a brake mechanism, actuating mechanisms for said clutch and brake mechanisms, each including toggle links, a control member, and an operating connection between it and the said clutch and brake actuating mechanisms.

2. In a drive mechanism, a drive shaft, a driven shaft, a clutch connection therebetween, a brake mechanism, actuating mechanisms for said clutch and brake mechanisms, each including toggle links, a control member, and an operating connection between it and the said clutch and brake actuating mechanisms, comprising a lever actuated by said control member, and a link connection between it and the clutch and brake controlling toggles respectively.

3. In a drive mechanism, a drive shaft, a driven shaft, a clutch connection therebetween, a brake mechanism, actuating mechanisms for said clutch and brake mechanisms, each including toggle links, a control shaft transversely positioned in relation to the drive and driven shafts a lever thereon, and a link connection between it and the brake and clutch controlling toggles respectively.

4. In a drive mechanism, a drive shaft, a driven shaft, a clutch connection therebetween, a brake mechanism, actuating mechanisms for said clutch and brake mechanisms, each including a pair of toggle links, a control member, and an operating connection between it and the said clutch and brake actuating mechanisms, and means for adjusting the outer pivot point of the outer link of each of said pairs of toggle links.

5. In a drive mechanism, a drive shaft, a driven shaft, a clutch connection therebeteween, a brake drum on said driven shaft, a brake band thereabout, and means for holding it normally disengaged, a control member for said clutch and brake band including a shaft in transverse relation to the drive and driven shafts, a lever thereupon and a link connection between it and the clutch and brake band respectively.

6. In a drive mechanism, a drive shaft, a driven shaft, a clutch connection therebetween, a brake drum on said driven shaft, a brake band thereabout, and means for holding it normally disengaged, a control member for said clutch and brake band including a shaft in transverse relation to the drive and driven shafts, a lever thereupon and a link connection between it and the clutch and brake band respectively, an actuating mechanism for clutch and brake band respectively, each including a pair of toggle links the outer link of each pair being pivoted to a normally fixed abutment, a control member, a lever thereupon and a link connection between the lever and each pair of toggle links.

7. In a drive mechanism, a drive shaft, a driven shaft, a clutch connection therebetween, a brake drum on said driven shaft, a brake band thereabout, and means for holding it normally disengaged, a control member for said clutch and brake band including a shaft in transverse relation to the drive and driven shafts, a lever thereupon and a link connection between it and the clutch and brake band respectively, an actuating mechanism for clutch and brake band respectively, each including a pair of toggle links, the outer link of each pair being pivoted to a normally fixed base, a control member, a lever thereupon and a link connection between the lever and each pair of toggle links, and means for adjusting the base of the outer links of each pair of toggle links.

8. In a drive mechanism, a drive shaft and a driven shaft, a brake associated therewith, a clutch intermediate said drive and driven shafts, a control member, yielding means for normally holding said brake and clutch in inactive position, and a positive actuating connection between said member and said brake and clutch respectively, adapted to oppose such yielding means.

9. In a drive mechanism, a drive shaft and a driven shaft, a brake associated therewith, a clutch intermediate said drive and driven shafts, a control member, means for normally holding said brake and clutch in inactive position, and a positive actuating connection between said member and said brake and clutch respectively, adapted to oppose such means.

10. In a drive mechanism, a drive shaft and a driven shaft, a brake associated therewith, a clutch intermediate said drive and driven shafts, a control member, yielding means for normally holding said brake and clutch in inactive position, and a toggle connection between said member and said brake and between said member and said clutch, adapted to oppose said yielding means in response to movement of said member.

11. In a drive mechanism, a drive shaft, a driven shaft a brake member and means for holding it normally in inoperative position, a clutch intermediate said drive and driven shafts, and means for normally holding it in neutral position, a control member and a connection between it and said brake member and between it and said clutch, adapted, at different positions of the control member, to move them in operating position.

12. In a drive mechanism, a drive shaft, a driven shaft, a brake member, and means for holding it normally in inoperative position, a clutch intermediate said drive and driven shafts, and means for normally holding it in neutral position, a control member, and connections between it and the brake and clutch member respectively, such connections being adapted, when the member is initially advanced from its neutral or rest position to actuate the brake member and, when it advances to its next position, to release the brake and actuate the clutch.

13. In a drive mechanism, a drive shaft, a driven shaft, a brake member, and means for holding it normally in inoperative position, a clutch intermediate said drive and driven shafts, and means for normally holding it in neutral position, a control member, and connections between it and the brake and clutch member respectively, such connections being adapted, when the member is initially advanced from its neutral or rest position to actuate the brake member and, when it advances to its next position to release the brake and actuate the clutch, and when advanced a further step to leave both brake and clutch members in inactive position.

14. In a drive mechanism, a drive shaft, a driven shaft, a clutch connection therebetween, a brake mechanism, actuating mechanisms for said clutch and brake mechanisms, each including a pair of toggle links, normally fixed pivots for the outer end of one link of each such pair of toggle links, the outer end of the opposite link of each pair being in actuating relation with the clutch and the brake mechanism respectively, a control member and a linkage connection between it and each of said pair of toggle links and means for adjusting the location of said control member in relation to said toggle links.

15. In a drive mechanism, a drive shaft, a driven shaft, a clutch connection therebetween, a brake mechanism, actuating mechanisms for said clutch and brake mechanisms, each including a pair of toggle links, normally fixed pivots for the outer end of one link of each such pair of toggle links, the outer end of the opposite link of each pair being in actuating relation with the clutch and the brake mechanism respectively, a control member and a linkage connection between it and each of said pair of toggle links and means for adjusting the position of the said normally fixed pivots.

16. In a drive mechanism, a drive shaft, a driven shaft, a clutch connection therebetween, a brake mechanism, actuating mechanisms for said clutch and brake mechanism, each including a pair of toggle links, normally fixed pivots for the outer end of one link of each such pair of toggle links, the outer end of the opposite link of each pair being in actuating relation with the clutch and the brake mechanism respectively, a control member and a linkage connection between it and each of said pair of toggle links and means for adjusting the location of said control member in relation to said toggle links, and means for adjusting the position of the said normally fixed pivots.

17. In a drive mechanism, a drive shaft, a driven shaft, a clutch connection therebetween, a brake mechanism, actuating mechanisms for said clutch and brake mechanisms, an enclosing housing, each such actuating mechanism including a toggle linkage secured at one end in normally fixed relation to the housing and at the opposite end to the clutch and brake mechanism respectively, a control member and an actuating connection between said control member and both toggle mechanisms.

18. In a drive mechanism, a drive shaft, a driven shaft, a clutch connection therebetween, a brake mechanism, a housing surrounding said clutch and brake mechanisms, actuating mechanisms for said clutch and brake mechanisms, within said housing, each including a toggle connection with the housing, a lever within the housing, and means for actuating it, external to the housing, and a linkage connection between said lever and each of said toggle connections.

19. In a drive mechanism, a drive shaft, a driven shaft, a clutch connection therebetween, a brake mechanism, a housing surrounding said clutch and brake mechanisms, actuating mechanisms for said clutch and brake mechanisms, within said housing, each including a toggle connection with the housing, a lever within the housing, and means for actuating it, external to the housing, and a linkage connection between said lever and each of said toggle connections, and means for adjusting the center of rotation of said lever in relation to said toggle connections.

20. In a drive mechanism, a drive shaft, a driven shaft, a clutch connection therebetween, a brake mechanism, a housing surrounding said clutch and brake mechanisms, actuating mechanisms for said clutch and brake mechanisms, within said housing, each including a toggle connection with the housing, a lever within the housing, and means for actuating it, external to the housing, and a linkage connection between said lever and each of said toggle connections, and means for adjusting the pivot points of the toggle connections with the housing.

21. In a drive mechanism, a drive shaft, a driven shaft, a clutch connection therebetween, a brake mechanism, a housing surrounding said clutch and brake mechanisms, actuating mechanisms for said clutch and brake mechanisms, within said housing, each including a toggle connection with the housing, a lever within the housing, and means for actuating it, external to the housing, and a linkage connection between said lever and each of said toggle connections, and means, operable from without the housing, for adjusting the pivot points of the toggle connections with relation to the housing.

22. In a drive mechanism, a drive shaft, a driven shaft, a clutch connection therebetween, a brake mechanism, a housing surrounding said clutch and brake mechanisms, actuating mechanisms for said clutch and brake mechanisms, within said housing, each including a toggle connection with the housing, a lever within the housing, and means for actuating it, external to the housing, a linkage connection between said lever and each of said toggle connections, and means, operable from without the housing, for adjusting the pivot points of the toggle connections with relation to the housing, including in part screw threaded stems extending outwardly through the housing and externally positioned lock nuts therefor, the toggle being pivoted to the inner ends of said stems.

23. In a drive mechanism, a drive shaft, a driven shaft, a clutch connection therebetween, a brake mechanism, a housing surrounding said clutch and brake mechanisms, actuating mechanisms for said clutch and brake mechanisms, within said housing, each including a toggle connection with the housing, and adjustable means, mounted on the housing, to which the toggle connections are pivoted.

24. In a drive mechanism, a drive shaft, a driven shaft, a clutch connection therebetween, a brake mechanism, a housing surrounding said clutch and brake mechanisms, actuating mechanisms for said clutch and brake mechanisms, within said housing, each including a toggle connection with the housing, a lever within the housing, and means for actuating it, external to the housing, and a linkage connection between said lever and each of said toggle connections, and abutments adapted to limit the movement of said toggle connections.

25. In a drive mechanism, a drive shaft, a driven shaft, a clutch connection therebetween, a brake mechanism, a housing surrounding said clutch and brake mechanisms, actuating mechanisms for said clutch and brake mechanisms, within said housing, each including a toggle connection with the housing, a lever within the housing, and means for actuating it, external to the housing, a linkage connection between said lever and each of said toggle connections, and abutments adapted to limit the movement of said toggle connections, the proportion of parts being such that when one toggle connection is in actuating position the other is in inactive position.

26. In a drive mechanism, a drive shaft, a driven shaft, a clutch connection therebetween, a brake mechanism, a housing surrounding said clutch and brake mechanisms, actuating mechanisms for said clutch and brake mechanisms, within said housing, each including a toggle connection, a control lever within said housing, a link connection between said control lever and said toggle connections, a shaft, to which said lever is secured, projecting outwardly through the housing wall, and means for adjusting the position of the shaft.

27. In a drive mechanism, a drive shaft, a driven shaft, a clutch connection therebetween, a brake mechanism, a housing surrounding said clutch and brake mechanisms, actuating mechanisms for said clutch and brake mechanisms, within said housing, each including a toggle connection, a control lever within said housing, a link connection between said control lever and said toggle connections, a shaft, to which said lever is secured, projecting outwardly through the housing wall, and means for adjusting the position of the shaft, comprising a sliding member, adapted to be secured to the housing wall.

28. In a drive mechanism, a drive shaft, a driven shaft, a clutch connection therebetween, a brake mechanism, a housing surrounding said clutch and brake mechanisms, actuating mechanisms for said clutch and brake mechanisms, within said housing, each including a toggle connection, a control lever within said housing, a link connection between said control lever and said toggle connections, a shaft, to which said lever is secured, projecting outwardly through the housing wall, and means for adjusting the position of the shaft, comprising a sliding member, adapted to be secured to the housing wall, the slide member and the housing wall being provided with inclined elongated apertures.

29. In a drive mechanism, a drive shaft, a driven shaft, a clutch connection therebetween, a brake mechanism, a control mechanism, and an operating connection between the control mechanism and the brake mechanism, and between the control mechanism and the clutch mechanism, said control mechanism including a shaft transversely positioned in relation to the drive and driven shafts, a lever thereon, and link connections between said lever and the brake clutch mechanism respectively, and means for adjusting the position of the said transverse shaft.

30. In a drive mechanism, a drive shaft, a driven shaft, a clutch connection therebetween, a brake mechanism, a control mechanism, and an operating connection between the control mechanism and the brake mechanism, and between the control mechanism and the clutch mechanism, and retaining means for said operating connection adapted, when it is placed in brake actuating position, to retain it in such position.

31. In a drive mechanism, a drive shaft, a driven shaft, a clutch connection therebetween, a brake mechanism, a control mechanism, an operating connection between the control mechanism and the brake mechanism, and between the control mechanism and the clutch mechanism, and retaining means for said operating connection adapted, when it is placed in brake actuating position, to retain it in such position, comprising a stud member on said control mechanism, a retaining plate apertured to receive it and yielding means for normally thrusting said plate toward said control mechanism.

32. In a drive mechanism, a drive shaft, a driven shaft, a clutch connection therebetween, a brake mechanism, actuating mechanisms for said clutch and brake mechanisms, each including toggle links, a control member, and an operating connection between it and the said clutch and brake actuating mechanisms, comprising a lever actuated by said control member, and a link connection between it and the clutch and brake controlling toggles respectively, a stud associated with the brake actuating toggle links adjacent the junction of said two links and the link connection with the control member, a retainer member, yieldingly opposed thereto, apertured to receive said stud at the brake actuating position of the toggle links.

33. In a drive mechanism, a drive shaft, a driven shaft, a clutch connection therebetween, a brake mechanism, actuating mechanisms for said clutch and brake mechanisms, each including a pair of toggle links, a control member, and an operating connection between it and the said clutch and brake actuating mechanisms, means for adjusting the outer pivot point of the outer link of each of said pairs of toggle links, a stud associated with the brake actuating pair of toggle links, adjacent the junction of said two links and their connection with the control member, a retainer member, yieldingly opposed thereto, having formed in its surface an elongate aperture aligned with the brake actuating position of the toggle links.

34. In a drive mechanism, a drive shaft, a driven shaft, a clutch connection therebetween, a brake mechanism, actuating mechanisms for said clutch and brake mechanisms, each including a pair of toggle links, a control member, and an operating connection between it and the said clutch and brake actuating mechanisms, and means for adjusting the outer pivot point of the outer link of each of said pairs of toggle links, a stud associated with the brake actuating toggle links adjacent the junction of said two links and the link connection with the control member, a retainer member, yieldingly opposed thereto, apertured to receive said stud at the brake actuating position of the toggle links, the aperture being elongated to compensate for the range of adjustment of the pivot point of the outer link of said brake actuating toggle links.

35. In a drive mechanism, a drive shaft and a driven shaft, a clutch connection therebetween, a brake mechanism, actuating means for said clutch and brake mechanisms and a single control member adapted to operate clutch and brake respectively through said actuating means, and means for adjusting the position of said control member.

36. In a drive mechanism, a shaft, a brake drum on said shaft, a brake band thereabout, and means for actuating said brake band including a control member, a pair of toggle links, a connection between the control member and said pair of links, and yielding means for maintaining said links in brake actuating position.

37. In a drive mechanism, a shaft, a brake drum on said shaft, a brake band thereabout, and means for actuating said brake band including a control member, a pair of toggle links, a connection between the control member and said pair of links, and yielding means for maintaining said links in brake actuating position, comprising a yieldingly mounted member, a depression in the surface thereof, and a member, associated with said toggle links, adapted to penetrate said depression when the links are in brake actuating position.

38. In a drive mechanism, a shaft, a brake drum on said shaft, a brake band thereabout, and means for actuating said brake band including a control member, a pair of toggle links, a connection between the control member and said pair of links, and yielding means for maintaining said links in brake actuating position, comprising a yieldingly mounted stop block, a stop depression in the surface thereof, and a stud associated with such toggle links, adapted to penetrate said depression when the links are in brake actuating position.

39. In a drive mechanism, a shaft, a brake drum on said shaft, a brake band thereabout, and means for actuating said brake band including a control member, a pair of toggle links, a connection between the control member and said pair of links, and yielding means for maintaining said links in brake actuating position, comprising a yieldingly mounted stop block, a stop depression in the surface thereof, and a stud associated with such toggle links, adapted to penetrate said depression when the links are in brake actuating position, said depression being elongate in form to permit engagement with said stud independent of adjustment of said toggle links.

40. In a drive mechanism, a shaft, a brake drum on said shaft, a brake band thereabout, and means for actuating said brake band including a control member, a pair of toggle links, a connection between the control member and said pair of links, a housing about said drive mechanism, and yielding means for maintaining said links in brake actuating position, comprising a stop block yieldingly mounted within the housing, aligning pins on said stop block adapted to penetrate said housing and a spring member interposed between said stop block and said housing, the stop block having a depression in its forward surface, and a member, associated with said toggle links, adapted to penetrate said depression when the links are in brake actuating position.

41. In a drive mechanism, a drive shaft, a driven shaft axially aligned therewith, a clutch mechanism interposed between the drive and driven shaft, a brake mechanism, a control mechanism, and an operating connection between the control mechanism and the brake mechanism.

42. In a drive mechanism, a drive shaft, a driven shaft axially aligned therewith, opposed clutch members on the drive and driven shaft respectively, a brake mechanism, a control mechanism and an operating connection between the control mechanism and the brake mechanism, and between the control mechanism and the clutch mechanism, said control mechanism including a shaft transversely positioned in relation to the drive and driven shafts, a lever thereon, and link connections between the said lever and the brake and clutch mechanism respectively.

43. In a drive mechanism, a drive shaft, a driven shaft axially aligned therewith, opposed clutch members on the drive and driven shaft respectively, a brake mechanism, a control mechanism and an operating connection between the control mechanism and the brake mechanism, and between the control mechanism and the clutch mechanism, a yielding means for holding the brake mechanism disengaged, and yielding means for holding the opposed clutch members disengaged.

44. In a drive mechanism, a closed housing, a drive and a driven shaft penetrating said housing, and in axial alignment with each other, a clutch connection interposed between the abutting ends of said shafts, a brake member associated with one of said shafts and a brake band thereabout, a control shaft penetrating said housing, in transverse relation to the drive and driven shafts, an exteriorly located control lever therefor and an interior connection between said control shaft and the brake and clutch mechanisms respectively.

45. In a drive mechanism, a closed housing, a drive and a driven shaft penetrating said housing, and in axial alignment with each other, a clutch connection interposed between the abutting ends of said shafts, a brake member associated with one of said shafts, and a brake band thereabout, a control shaft penetrating said housing, in transverse relation to the drive and driven shafts, an exteriorly located control lever therefor and an interior connection between said control shaft and the brake and clutch mechanisms respectively, including a lever on the control shaft, within the housing, and link connections between the lever and the brake and clutch mechanism respectively.

46. In a drive mechanism, a closed housing, a drive and a driven shaft penetrating said housing, and in axial alignment with each other, antifrictional bearing members, positioned in the opposite walls of said housing, adapted to receive said shafts, one of said shafts being provided with a reduced end in bearing contact with the opposed end of the other shaft, opposed clutch members mounted upon the shafts at their opposed ends, means for normally holding them disengaged, a brake associated with one of said shafts, an operating shaft penetrating said housing and a flexible connection between the inner end of said shaft and the brake and clutch mechanism respectively.

Signed at Streator, county of La Salle, and State of Illinois, this 29 day of June, 1926.

CHARLES H. BENEDICT.